April 16, 1946.   G. V. BRATZEL   2,398,577
PISTON FOR INTERNAL-COMBUSTION ENGINES
Filed June 1, 1944   2 Sheets-Sheet 1
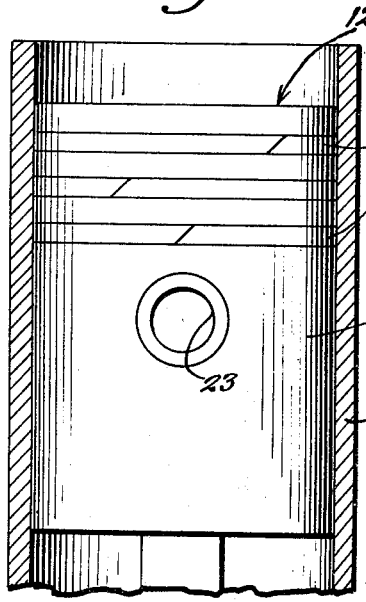
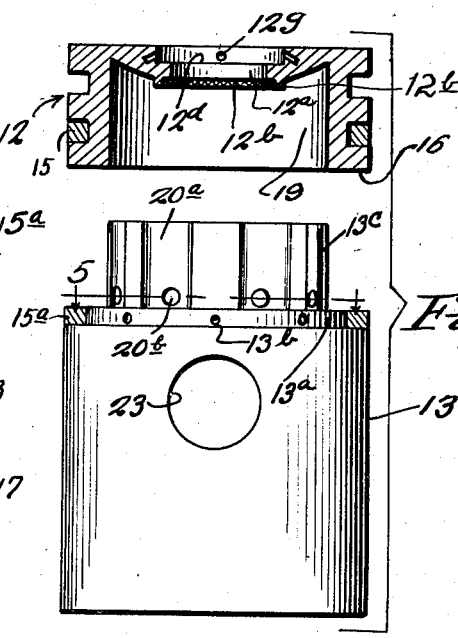
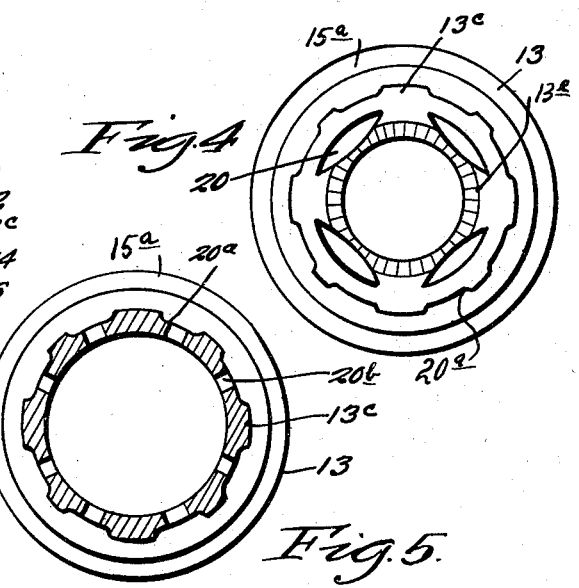
Inventor
GEORGE V. BRATZEL,
By  Clarence A. O'Brien
and Harvey B. Jacobson
Attorneys April 16, 1946.　　G. V. BRATZEL　　2,398,577
PISTON FOR INTERNAL-COMBUSTION ENGINES
Filed June 1, 1944　　2 Sheets-Sheet 2

Inventor
GEORGE V. BRATZEL,
By Clarence A. O'Brien
and Harvey B. Jacobson
Attorneys Patented Apr. 16, 1946

2,398,577

UNITED STATES PATENT OFFICE 2,398,577

PISTON FOR INTERNAL-COMBUSTION ENGINES

George V. Bratzel, Menlo Park, Calif.

Application June 1, 1944, Serial No. 538,254

2 Claims. (Cl. 309—14)

My invention relates to pistons for internal combustion engines which can be repacked in position without removal from the engine.

The usual procedure in repacking pistons is to open the crankcase, disconnect the crank pins, remove the connecting rod through the bottom and lift out the piston. After this has been done the old piston rings can be taken off and the piston cleaned and new rings put on. The piston is now ready for re-instalment.

The main object of the present invention is now to avoid all this labor, waste of time and consequent expense by providing a piston that can be repacked in place, that is, the old packing rings taken off and replaced by new ones without removing the entire piston, but only by taking off the engine head, no radical changes in the construction of the engine being needed.

This invention is illustrated in the accompanying drawings in which:

Figure 1 is a vertical, fragmentary section showing the bore of the combustion chamber with piston and packing rings in position.

Figure 2 is a vertical section of a piston body with removable head or cap assembled.

Figure 3 is an elevation of the piston body in Figure 2 with the head or cap lifted off and shown in section.

Figure 4 is a top plan view of the piston body in Figure 3 without the head or cap.

Figure 5 is a section along the line 5—5 of Figure 3.

In the accompanying drawings the same numerals refer to the same details.

Figure 6:
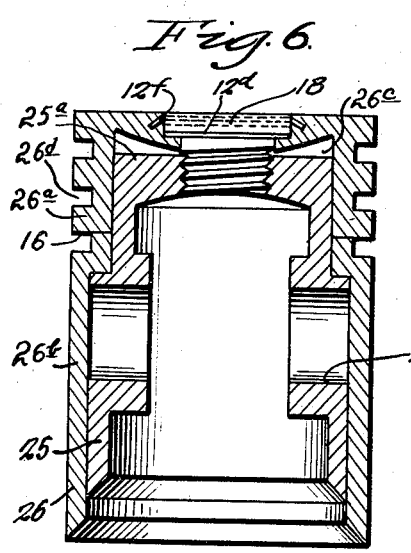
Figure 6 is a view similar to Figure 2 of a modified form of piston consisting of a core portion and a ring shell portion.

Referring first to Figures 1 to 5, the piston, which is of standard type, is here made in two main parts, namely, the cap 12 and the body 13 with two grooves 14 in the cap or head 12 for the two upper packing rings 15, while space for a third ring 15a is furnished just below the bottom surface 16 of the cap 12 around a shoulder 13a having oil vents 13b. This permits the removal of the third packing ring as soon as the cap 12 has been detached, while the two first rings 15 remain on the cap to be taken away with the head, the piston body stays in place in the engine cylinder 17.

The upper end of the piston body 13 is formed as a spider or neck 13c of smaller diameter than the body 13 and fits snugly in a recess or chamber 19 in the cap 12, when the cap is secured in position on the piston body by a cap screw 18, threaded in the spider 13c.

After replacing the two upper packing rings 15 on the cap 12, and inserting a third ring around the shoulder 13b of the spider, the cap or head 12 is then ready to be pushed down over the spider 13c until its shoulder 16 meets with the installed third ring 15a.

The roof portion of the head 12 has a serrated neck on its underside at 12b, see Figure 3, around the hole 12a which runs right through the roof for cap screw 18, to coincide and interlock with serration 13e on top of spider or neck 13c around the threaded hole for the cap screw 18. When the two rings 15 have been replaced by new ones, the head 12 is ready to be pushed down over neck or spider 13c, Figures 2 and 3, and this will cause the serrations 12b to interlock with 13e so that head 12 will not turn and become loose. A metal packing washer is preferably placed in the recess 12d of the screw hole in the center of the head 12 and the cap screw 18 screwed down into place as shown in Figure 2. When the cap screw 18 is drawn tight, a tiny hole 12g is drilled at each end of the slot in the cap screw and into the wall at the recess 2d of head or cap 12. These holes are drilled in inclined direction slightly downward and about an eighth of an inch deep, see Figure 3, providing a hole for a wire pin 12f, which is cut about a quarter of an inch longer than the width of head of cap screw 18. This wire pin is bent so it will enter into the holes 12g and is then flattened down into the groove 12h of the cap screw 18. This will lock the cap screw. To remove the cap screw the wire pin has to be cut off or pried out.

Figure 4 shows the venting and lubrication system in the neck or spider 13c to keep the head or cap 12 from overheating. The four vertical openings 20 will permit oil to splash up into the recess or chamber 19 on the underside of the head 12 and run down through flutes 20a provided in the side walls of neck or spider 13c, out through holes 20b and thence into the crankcase. The holes 20b are drilled radially into the side wall of the spider 13c above the shoulder 13a and the oil vents 13b as here shown but the flutes may continue straight down for the convenience of casting. The crank pin bearing is indicated at 23 in Figures 1 and 2.

In Figure 6 is shown a modification in which this piston has a nearly full length core 25 with a neck 25a of smaller diameter than its body and a ring shell 26 surrounding the core and having the full length of the piston. The shell preferably has a cap 26a and a skirt 26b separable along the surface 16. The cap 26a has packing grooves 26d on the outside and a recess or chamber 26c inside closely fitting the neck 25a of the core 25. This is the piston construction suitable for all new cars, while the construction in Figure 2 is intended for use on old cars in order to make exchange of packing rings 15, 15a possible without dismounting the crankcase.

The crank pin bearing 27 in Figure 6 extends only through the walls of the core 25, and all packing ring grooves 28 are cut around the upper end of the shell 26. The shell 26 and the core 25 are firmly secured together by a central cap screw 18 with washer 12d as before and securing pin 12f. Shell 26 and core 25 can be slotted and vented on the adjacent sides for oil circulation and expansion the same as in regular pistons as indicated in Figures 2, 3 and 4. Instead of making the cap proper 26a and the skirt 26b as a unit, they may be separated along line 16 flush with the top surface of the third packing ring 15a. This will make the three species alike as regards diameter and depth of cap.

Figure 7:
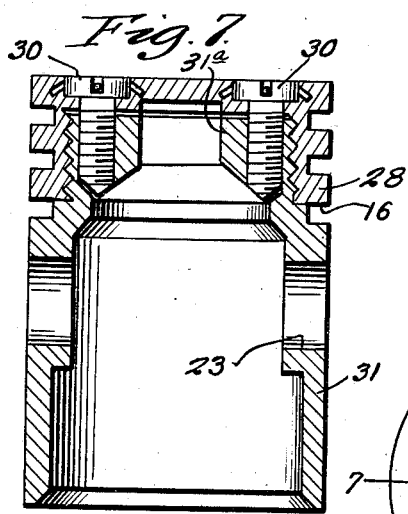
Figure 7 is a vertical section of construction similar to Figure 2, but with the cap threaded on the spider and two cap screws for securing the cap or head from the spider.
Figure 11:
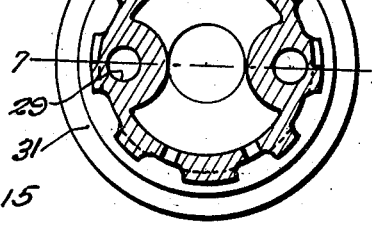
Figure 11 is a top plan view of the cap in Figure 8.
Figure 10:
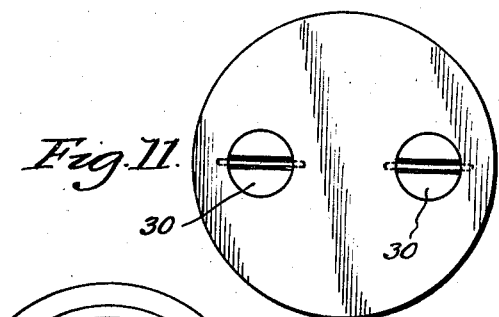
Figure 10 is a cross section along the line 10—10 of Figure 8.
Figure 9:
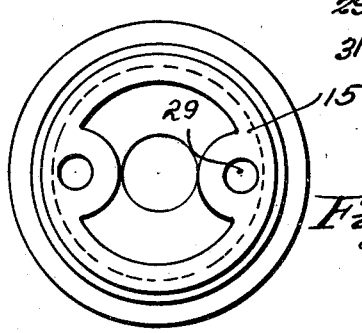
Figure 9 is a top plan view of the piston body in Figure 8.

Should it be impracticable on some motors to use a center cap screw then two or more threaded holes 29 are provided in top of core 25, see modification in Figure 7, and two or more small cap screws, and the head of the shell reinforced accordingly, see Figures 7 to 11.

Figure 8:
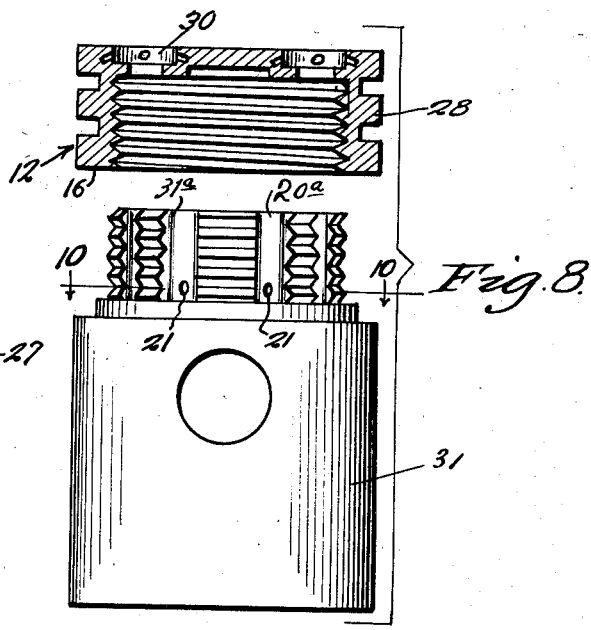
Figure 8 is a view similar to Figure 3 of the modification in Figure 7 showing the position of two cap screws for securing the removable head on the body.

Figures 7 and 8 show that the head or cap 28 instead of being smooth faced as in Figures 1 to 5, is made to screw on like a jar cover and is locked with two cap screws 30 engaging in the neck 31a of threaded sockets 29 in the piston body 31. To remove head or cap 28 the usual spanner holes or flats provide hold for a face spanner wrench. The threaded type, Figures 7 and 8, can be made without spider. The center of the core is, however, reinforced around the threaded holes 29 for the cap screws 30. If oil is to circulate then the radial holes 20b the flutes 20a have to be provided, and the latter should be cut straight up and down not quite as deep as the threads, so as to be open when the head 28 is screwed home on the body 31. The flutes can be made to drain straight down or through the radial holes 20b.

In Figure 6, the piston core 25 is made with a shell 26. The shell is pushed over the core and held in place with a cap screw 18 and locked with wire pin, as described in connection with Figures 1 to 5. In case the shell is made in two pieces, only the cap proper 26a need be removed and the skirt 26b left on the core to exchange the packing rings 15, 15a.

The construction with core and shell and with two cap screws instead of one, are self-explanatory and should easily be understood from the foregoing description. It will, therefore, be clearly seen how this improvement can be applied both on old and new motors and make considerable saving in repairs.

It is to be understood that the invention as here disclosed is not limited to the details here described and shown but that the same may be varied widely without departing from the spirit of the invention as defined by the subjoined claims.

Having described the invention, what is claimed as new is:

1. In a motor with expansible-type chamber, a divisible piston adapted for repacking in position; comprising a cap or upper portion and a skirt or lower position and means for firmly assembling and quickly disassembling said portions; said skirt provided with bearings for a crank pin, and a neck fitting snugly in the cap and being provided with an abutment for said cap and providing a seat for receiving a lowermost metal packing ring; said cap having grooves for other metal packing rings, and being adapted to abut with its bottom surface against the said lowermost packing ring, interlocking serrations provided between adjacent surfaces of the cap and the neck of the skirt to prevent relative turning; said neck of the skirt being externally fluted and provided with radial oil vents connecting said flutes with its hollow interior.

2. In a motor with expansible-type chamber, a divisible piston adapted for repacking in position; comprising a cap or upper portion provided with grooves for packing rings and a skirt or lower portion, and means for firmly assembling and quickly disassembling said portions; said skirt consisting of an outer sleeve and an inner core, which core is provided with bearings for a crank pin and a neck fitting snugly in said cap; said outer sleeve having an abutment for said cap providing a seat for said lowermost metal packing ring; interlocking serrations provided between adjacent surfaces of the cap and the neck of the skirt to prevent relative turning; said neck of the skirt being externally fluted and provided with radial oil vents connecting said flutes with its hollow interior.

GEORGE V. BRATZEL.